Sept. 9, 1969     C. D. HENNING     3,465,431
METHOD FOR MAKING BASEBALL SEAM MAGNETIC COILS
Filed April 10, 1967
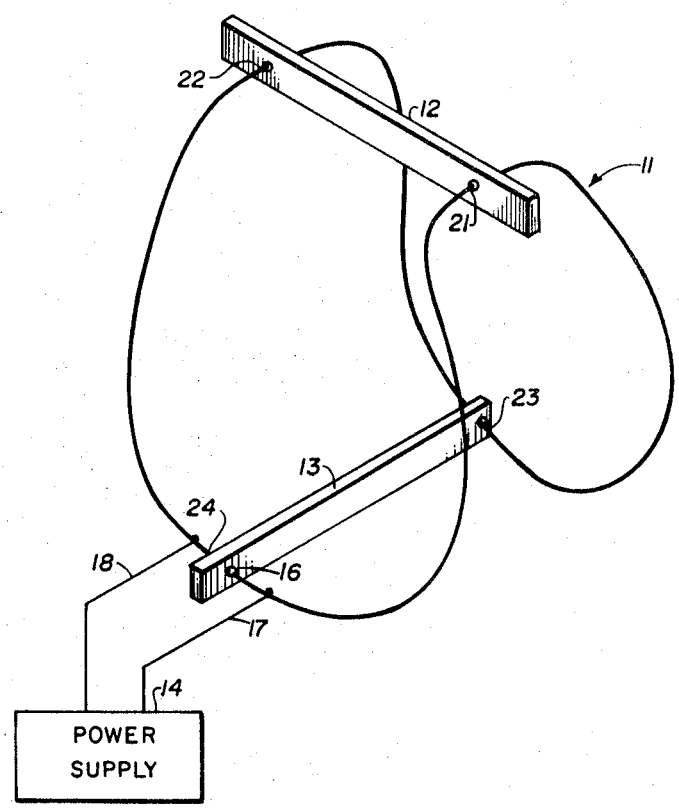
INVENTOR.
CARL D. HENNING
BY
ATTORNEY

United States Patent Office 3,465,431
Patented Sept. 9, 1969

3,465,431
METHOD FOR MAKING BASEBALL SEAM
MAGNETIC COILS
Carl D. Henning, Livermore, Calif., assignor to the United
States of America as represented by the United States
Atomic Energy Commission
Filed Apr. 10, 1967, Ser. No. 629,826
Int. Cl. H01f 7/06; B23p 17/00
U.S. Cl. 29—602                          9 Claims

ABSTRACT OF THE DISCLOSURE

A twisted electromagnetic coil is made of a pliable conductive wire in which self-induced tensional and bending forces exist tending to deform the coil. Such deformation is checked by tensile bars placed across various opposed regions of the coil which only counter tensional forces, while the bending forces are allowed to deform the wire. The coil is pulsed with a large current to cause permanent deformation so that the resulting deformed coil, now free of bending moments, resembles the original coil to the extent that the tensile bars have preserved certain dimensions of the coil. The moment-free coil serves as a model moment-free shape from which other moment-free coils may be built.

Background of the invention

This invention relates to magnet coils and a method for determining the precise shape and support structure geometry of magnet coils which will be free from bending moments, and especially to a baseball seam type coil and support structure which has a moment-free shape. This invention arose in the course of Contract W-7405-ENG-48 with the United States Atomic Energy Commission.

Magnetic coils in present day technology carry currents of millions of amperes and generate magnetic fields having intensities approaching a million times that of the earth's magnetic field. Such magnetic coils are used, for example, in the controlled thermonuclear reactor field, to trap charged particles in a volume enclosed within the magnetic coil. If a sufficient number of charged particles can be trapped within the magnetic coil at a sufficiently high temperature, it is predicted that thermonuclear reactions giving off tremendous quantities of energy, may be generated. However, to provide a sufficiently high magnetic field to trap plasma of a high density, very high currents must be present in the magnetic coil. These currents, in turn, generate tremendous forces which act on the various portions of the coil and tend to deform the coil by the combined action of tensile forces and bending moments.

In principle, the forces and moments which are generated in pulsed coils can be calculated by adding for every point of the coil the forces exerted upon it by the currents flowing through every other point of the nearby coil or coils. The resultant vector can then be resolved into tensile force components acting along the coil, which ultimately have to be borne by the coil itself, and into components perpendicular to the wire, the sum of which exerts a deforming influence upon the coil structure. In order to accommodate the latter forces, henceforth referred to as bending forces or moments, a support structure must be provided to buttress the coil against deformation.

Basically, these forces have long been known and are readily calculated for simple cases, e.g., the forces with which two parallel wires carrying currents magnetically repel or attract each other, depending on the relative direction of the currents. However, in the case of a magnetic coil formed by either one or many conductors, where the geometry of the conductors is more complicated, i.e., having the twists and turns in the coil which will cause repulsive and/or attractive forces between the coil parts, the forces and moments are much more difficult, or even impossible, to assess. For example, the evaluation of tensile forces in a structure due to magnetic forces can be carried out only with sophisticated mathematical techniques, e.g., a computer program such as FORCE, as described in "A Computer Program for Calculating Magnetic Forces Developed in Electromagnets," Proceedings of the Symposium on Engineering Problems of Controlled Thermonuclear Research, Gatlinburg, Tenn., October 1966, or see the Report UCRL-24917, published by the Lawrence Radiation Laboratory, Livermore, Calif. On the other hand, the evaluation of the bending moments is even more difficult than the evaluation of tensile forces in the case of the complex force distributions and the redundant support structures usually employed, and for such coils as the baseball seam soil referred to above, no precise solution has been found thus far.

Description of the prior art

In the past, such magnetic forces have simply been counteracted by providing very large support structures, safely capable of withstanding both the high tensile forces and bending moments which could possibly be imposed by the magnetic loading. However, for the more powerful magnets, the size and bulk of the support structures necessary to provide ample strength to accommodate all possible forces and moments is too unwieldly and interferes with ready access to the magnet interior.

Another problem in using massive structural supports involves the recent application of a superconducting technology to magnetic coils. At superconducting temperatures, the amount of coolant required to lower the temperature of large structural supports, as well as the superconductor, becomes enormous. Either large amounts of liquid helium or a very low temperature refrigerator is required. Both are very expensive, and any reduction in heat capacity of the superconducting coil means a considerable savings during cooldown.

Summary

It is our object to find a shape for magnetic coils which does not tend to deform and therefore does not require massive support structures.

Such a shape is found by forming a pliable conductive material into the generally desired coil shape. Tensile bars are affixed between coil regions across which opposing magnetic forces act in order to preserve the spacing between these coil regions at all times. The coil is then pulsed with a short duration intense current pulse which causes tensional and bending forces in the conductor. Since the conductor is readily pliable, it will permanently yield under bending forces to a shape where the bending forces are exactly balanced. The extent of permanent deformation is limited by the tensile bars which counter tensional forces and preserve important dimensions of the original coil shape.

Once such a coil shape has been established, free of bending forces or moments as described, larger magnets made of different materials, e.g., superconducting materials, can be formed from the model moment-free shape.

Brief description of the drawing

The single figure shows a plan view of a magnetic baseball seam type coil with structural supports.

Description of the preferred embodiments

The figure shows a magnetic coil 11 which is formed by semi-rigid conductor, such as 19-gauge copper wire. Insulative tensile members 12 and 13 are attached to preserve the general desired shape of the coil. The ends of the conductor are insulated from each other, but are structurally linked by an insulating material in a manner which will preserve the structural shape of the coil. Alternatively, the conductor ends can be terminated on a tensile member 13 at an end 16 where leads 17 and 18 from power supply 14 may be attached. If coil 11 is made of a superconducting material, power supply 14 may be detached once the initial shape of the magnet is determined, and the ends of the conductor may be joined by means of a suitable switch (not shown). The positioning of the tensile bars 12 and 13 is not critical in the sense that, regardless of where tensile bars are provided, the final shape of the coil will be free of the force causing bending, termed bending moments. A magnetic coil in which there are no bending forces is termed a moment-free shape. From the point of view of producing a specific moment-free configuration, the positioning of the bars is of importance, since the position of the tensile bars will determine the final shape of the magnet coil. In choosing opposing regions across which the tensile bars will be placed, it is important to select locations which preferably will be fixed with respect to each other. These locations are determined by the magnetic field configuration desired or by the symmetry of the magnetic coil or for other reasons. If the magnet coil has planes of symmetry, the tensile bars could ideally be positioned in or parallel to these planes. For example, the baseball coil has horizontal and vertical planes of symmetry which provide locations for the tensile bars. However, the bars need not be located in or parallel to symmetry planes. If two or more tensile bars are positioned fixing other opposed conductor regions, a moment-free shape will still result although symmetry may be destroyed to give a new shape which may be desired.

The tensile bars are preferably positioned in regions across which the magnetic forces causing gross deformation are greatest. By gross deformation is meant changes in shape which cause the coil to assume a less useful configuration. Once the tensile members are attached, there are extensive regions where the conductor may still deform. The tensile members are attached with pin joints or universal joints which cannot transmit bending moments. The conductor is of a material which is not strong enough to withstand bending moments from large forces. The conductor should be thin and not stiff, have a low section modulus and a low yield point so that the conductor will be readily permanently deformable. Furthermore, the conductor should have suitable separations between the material yield point and the ultimate strength. Annealed aluminum and copper conductors having round cross sections exemplify these desirable qualities. The conductor is affixed to tensile bars 12 and 13 by means of pin joints at regions 21, 22 and 23, 24 respectively. Pin joints are incapable of transmitting bending moments. Power supply 14 is connected to the conductor at the ends of the conductor, to provide a very high, short duration current pulse. The current pulse must be intense enough to produce a magnetic field which causes deformation of the magnetic coil formed by the conductor 11, yet not so intense as to vaporize or break the wire. Once the current pulse is applied, magnetic forces will cause deformation of the magnetic coil and apply compressive or tension forces on the structural members 12 and 13. Since the conductor is not able to withstand the bending moments, it will deform to a shape where there are no bending moments, i.e., where the force components which are perpendicular to the wire are exactly balanced.

The only requirement of the power supply is that the current be of the magnitude described. Such a power supply can be found in capacitor banks having energy densities of the order of a few megajoules, for example.

Once a magnetic coil has attained its moment-free shape by the method described, it may be used as a model for making superconducting magnets of the same or similar shapes. The shape of the baseball seam resembles a squashed baseball or oblate spheroid seam, whose minor diameter is about 8/10 of its major diameter. The preferred starting shape for producing a moment-free squashed baseball seam coil approximates the curve described by the intersection of a hyperbolic paraboloid with an oblate spheroid. The equations for these curves are as follows:

oblate spheroid:

$$\frac{x^2+y^2}{a^2}+\frac{z^2}{b^2}=1$$

hyperbolic paraboloid:

$$x^2-y^2=cz$$

where $$c=\frac{ab(L/h)^2}{\sqrt{a^2+b^2(L/h)^2}}$$

In the above equations, $a$ is the major radius of the oblate spheroid, $b$ is the minor radius, $2h$ is the coil height, $2L$ is the length of tensile members 12 and 13, S is the arc length which is taken to be half the distance from the end of support member 12 to an end of support member 13. Geometrically, the coil compares to four helical curves, $$L/a=1\frac{1}{\sqrt{2}}L/a$$

These parameters defines the physical shape and dimensions of the pulsed baseball which is a very close approximation to the moment-free baseball coil, and furnishes equations which can be used for mathematical calculations of the resultant magnetic fields when currents are applied, or plasma confinement characteristics. Thus, in order to use the resulting magnetic field for thermonuclear plasma confinement, it is desirable to know the magnetic field distribution, mirror ratio. A computer code called "MAFCO" (see Report UCRL-7744 published by Lawrence Radiation Laboratory, Livermore, Calif.) is used to determine these parameters, using various values of the ratio of the support length L to the major radius $a$; that is, $L/a$. The following is an example of typical parameters for a baseball coil using a model derived from the method herein described:

Constructional parameters—

(1) Minor radius—$b=40$ centimeters
(2) Major radius—$a=50$ centimeters
(3) Support link length—$2L=38$ centimeters
(4) Coil height—$2h=74$ centimeters
(5) Path length of single turn—$4S=472$ centimeters
(6) Volume of magnetic well—$V=45,000$ cu. cm.
(7) Current—$I=3.66\times 10^6$ amps
(8) Maximum tensile force in the conductor—$1.31\times 10^6$ lbs.
(9) Lobe force—$1.33\times 10^6$ lbs.
(10) Type of wire—19 gauge copper Although the foregoing example is given in reference to a baseball coil, it is contemplated that other magnetic coils are amenable to the same process. The only requirement the magnetic coil must have in order that my process may be applied thereto is that the basic shape which is desired must be symmetrical for the pulsing technique to be effective. My design is neither limited by the number of conductors which can be pulsed at the same time to give a single magnet shape, nor by the size of the desired conductor.

This invention has provided a method of making coils which are free of bending moments. The elimination of bending moments on the coil structure makes possible a much more efficient use of structural material and a reduction in support weight and bulk. This reduction leads to greater accessibility to the coil interior for experimental apparatus. The new lightweight magnet shapes made possible by this invention are also very well suited for use in aerospace technology.

Accordingly, the only limits imposed on my invention are those of the following claims.

I claim:
1. A method of making a magnetic coil free of bending moments, comprising:
   (a) forming a pliable conductive wire into the approximate shape of said magnetic coil, said wire defined by a series of consecutive regions, each of said regions subject to magnetic bending and tension forces from other regions in the same wire when current flows in said wire;
   (b) connecting pairs of regions with insulative tensile bars to prevent the relative motion of the members of said pairs and to counter tension forces due to currents; and
   (c) pulsing said pliable conductive wire with an intense short duration current pulse so that said bending forces permanently displace the relative positions of said regions until the bending forces in said regions are balanced.

2. The method of claim 1, further specified wherein the intensity of said current pulse is of an intensity great enough to permanently deform said conductor, but less than the intensity which would melt said conductor and exceed the ultimate strength thereof.

3. The method of claim 1, further specified wherein the conductive material has a low section modulus, is easily bendable, and has low yield point.

4. The method of claim 1, further specified wherein said tensile bars are attached to said coil regions with means responsive only to tension forces.

5. The method of claim 1, further defined wherein said conductive material is formed into the shape of a baseball seam.

6. The method of claim 1, further defined in that said magnetic coil free of bending moments comprises a conductor arranged to approximate the curve defined by the intersecting surfaces of an oblate spheroid and a hyperbolic paraboloid, said curves defining mutually perpendicular planes of symmetry, and insulative tensile members for fixing the relative position of coil regions between which opposing magnetic forces exist, at least on of said tensile members placed parallel to each plane of symmetry.

7. The method of claim 6, further defined in that said conductive wire is superconducting.

8. The method of claim 6, further defined wherein the equations of said surfaces are:

oblate spheroid:

$$\frac{x^2+y^2}{a^2}+\frac{z^2}{b^2}=1$$

hyperbolic paraboloid:

$$x^2-y^2=cz$$

where $$c=\frac{ab(L/h)^2}{\sqrt{a^2+b^2(L/h)^2}}$$

$a=$ major radius of the oblate spheroid,
$b=$ minor radius of the oblate spheroid,
$L=\frac{1}{2}$ length of tensile members, $$h=a\left(1-\frac{L}{\sqrt{2a}}\right)=1/2 \text{ height of the coil.}$$

9. The method of claim 8, further defined in that said tensile members are insulators affixed to said conductor by means of pin joints.

References Cited

UNITED STATES PATENTS 3,333,328  8/1967  Rushing _____ 29—605 X

JOHN E. CAMPBELL, Primary Examiner

C. E. HALL, Assistant Examiner

U.S. Cl. X.R.

29—421, 605; 336—207, 225